Feb. 2, 1960 L. A. BENTON 2,923,439
METHOD AND APPARATUS FOR FEEDING HIGH VISCOSITY MATERIALS
Filed Sept. 23, 1957 3 Sheets-Sheet 1

INVENTOR
LOUIS A. BENTON
BY
ATTORNEY

Feb. 2, 1960 L. A. BENTON 2,923,439
METHOD AND APPARATUS FOR FEEDING HIGH VISCOSITY MATERIALS
Filed Sept. 23, 1957 3 Sheets-Sheet 2

INVENTOR
LOUIS A. BENTON
BY
John A. McKinney
ATTORNEY

Feb. 2, 1960 L. A. BENTON 2,923,439
METHOD AND APPARATUS FOR FEEDING HIGH VISCOSITY MATERIALS
Filed Sept. 23, 1957 3 Sheets-Sheet 3
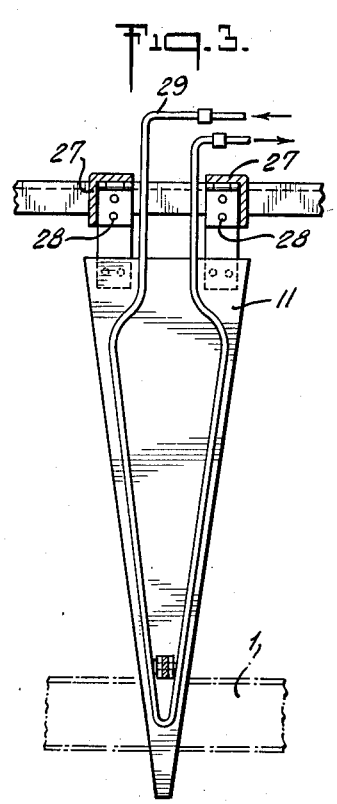
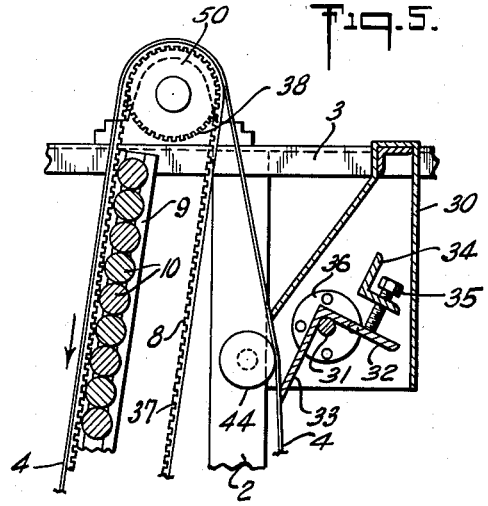
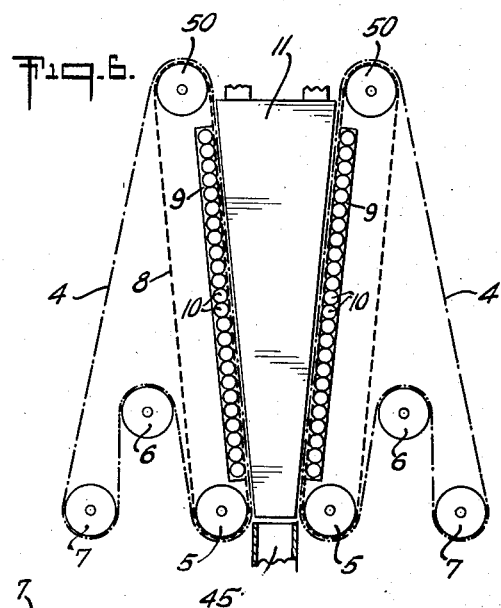
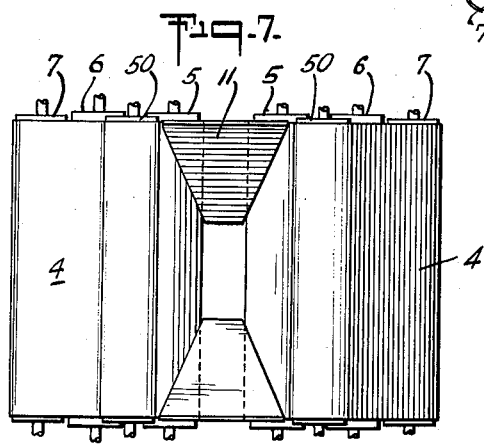
INVENTOR
LOUIS A. BENTON
BY
ATTORNEY

United States Patent Office 2,923,439
Patented Feb. 2, 1960

2,923,439

METHOD AND APPARATUS FOR FEEDING HIGH VISCOSITY MATERIALS

Louis A. Benton, Middlesex, N.J., assignor to Johns-Manville Corporation, New York, N.Y., a corporation of New York Application September 23, 1957, Serial No. 685,672

3 Claims. (Cl. 222—146)

This invention relates to a method and apparatus for feeding or compacting under pressure plastic masses or relatively highly viscous cohesive material, such as dough-like or putty-like sealing compounds and the like, into extruders or other equipment for further processing prior to packaging.

Feeding by hand sealing compounds and like materials of relatively high viscosity into packaging equipment, for example, the feed throat of an extruding machine, has been extremely difficult and cumbersome since the putty-like cohesive material is usually in the form of lumps in a relatively hard state while the inlet opening of the feed throat of the extruding machine may be of relatively small dimension. Hand-feeding such a machine is also a dangerous operation as relatively high pressure is required to force the material through the inlet opening of the extruding machine, which pressure has been commonly supplied either by the operator using his own hands or by using a pestle. In either case, such hand feeding operation not only may cause accidents or damage to the extruding machine, as by an operator's hand slipping into the feed screws of the extruder or by the pestle being caught between the feed screws, but also very often fails to continuously feed the material to the extruding device, allowing air to be entrapped between lumps of the material causing streaks or bubbles in the extruded sealing compound.

Mechanical devices for such feeding are also defective since, for example, a cylinder and piston feeder device has to be replenished periodically with material thereby causing interruptions of the feeding operation. Likewise, a cylinder and piston feeder fails to prevent air from being entrapped in the material thereby also allowing streaks and bubbles to be developed in the extruded product.

The primary object of the present invention therefore is to provide a method and apparatus for compacting cohesive material, wherein the material is compressed into a desired shape in a hopper and delivered in a continuous flow for further processing.

It is a further object of the present invention to provide a method and apparatus for delivering cohesive material under considerable pressure for rapid processing, wherein the material is compressed by a stationary unit and pulled down by moving conveyor belts.

A still further object of this invention is to provide a method and apparatus for automatically and continuously feeding or compacting under pressure lumps, composed of relatively high-viscosity materials, into a uniform voidless extrusion.

In brief, a feeding apparatus, constructed in accordance with the present invention, comprises a pair of endless conveyor belts mounted in spaced relation and in inclined planes which converge downwardly to define a passage for compacting, under pressure, masses of cohesive material and for conveying such material as a uniform voidless extrusion to additional apparatus for further processing.

The invention will be more fully understood and further objects thereof will become apparent when reference is made to the following detailed description and the accompanying drawings in which:

Fig. 3 is an enlarged view of one of the side plates used in the instant invention;

Fig. 5 is a cross sectional view along lines 5—5 of Fig. 2;

Fig. 6 is a schematic view along lines 6—6 of Fig. 2; and

Fig. 7 is a plan view of the schematic view of Fig. 6.

Figure 1:
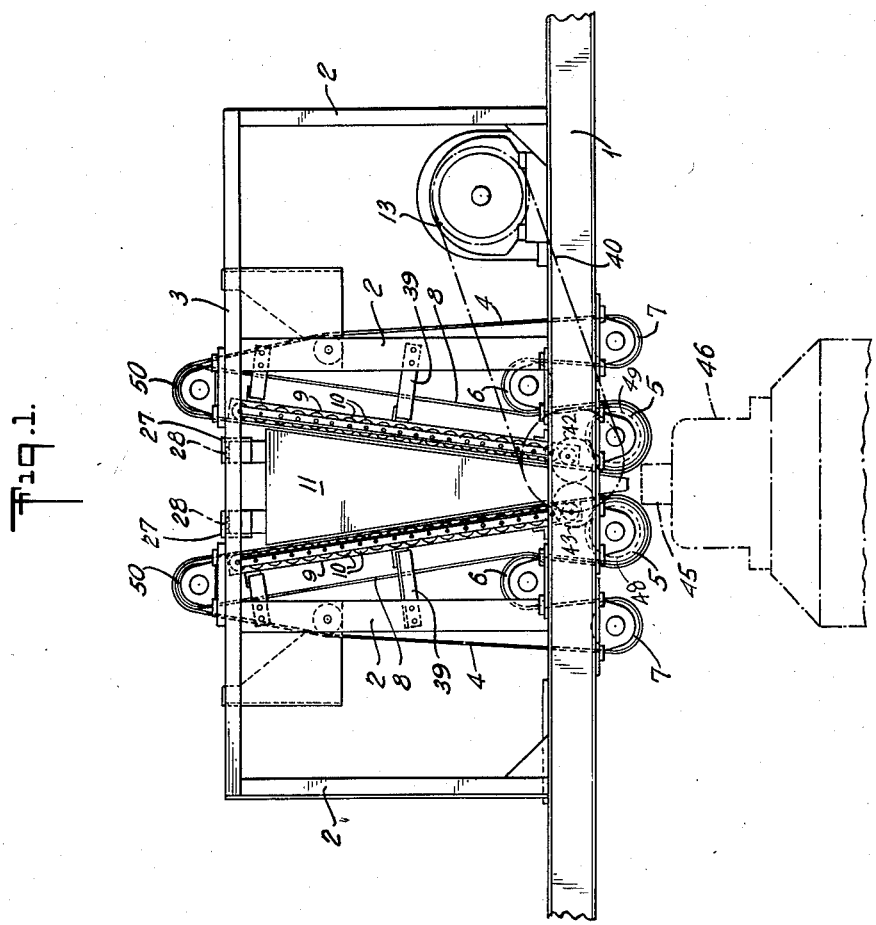
Fig. 1 is a side elevation view of the apparatus of the instant invention.
Figure 2:
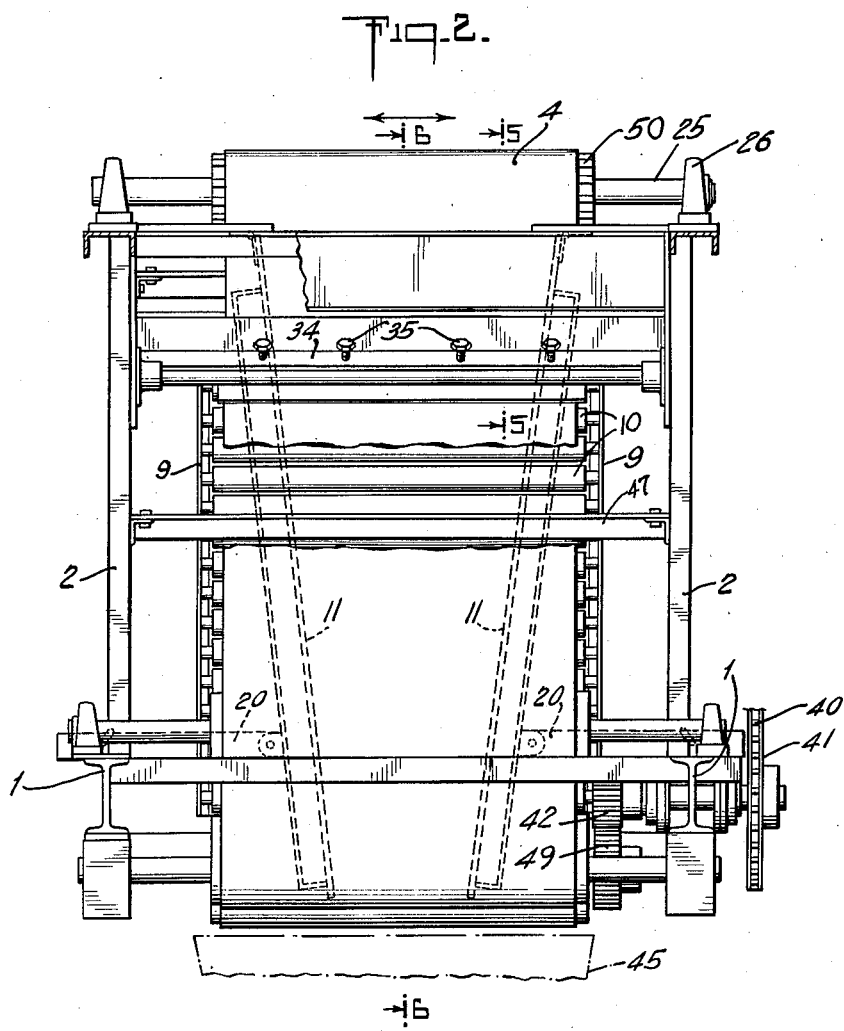
Fig. 2 is an end view of the apparatus of Fig. 1 with the drive motor detached.

Referring to the drawing, with particular reference to Figs. 1 and 2, the framework of the apparatus comprises a pair of lower horizontal I-beams 1 secured in any desired manner (not shown) to a foundation structure (not shown). Attached to the horizontal beams 1 are a plurality of vertical posts 2 supporting a pair of upper beams 3, parallel to beams 1, and a plurality of transverse bracers 47. Each of a pair of similar, continuous conveyor belts 4, converging toward the lower frame members 1, is rotatably mounted to the frame structure by a set of rollers journaled on the upper and lower horizontal beams. Thus, as comprising each such set, there is secured to the lower side of beam 1 a pair of rollers 5, 7; to the upermost side of the beam 1 is secured roller 6; and to the uppermost side of beam 3 is secured a roller 50. Belt 4 is wrapped around the aforementioned rollers in a continuous fashion, with a pair of belts forming lateral sides of an inverted truncated pyramid. Each roller is mounted on a shaft, as for example, roller 50 mounted on shaft 25, and appropriate bearings, such as bearing 26, are provided to rotatably support each such shaft. Rollers 6, 7 are conventional smooth surfaced rollers; rollers 50 and 5 have a gear cross-sectional shape formed with gear teeth 38 outlining the peripheral surface thereof (Fig. 5). Situated between the reaches of each of the belts 4 and wrapped around the rollers 50 and 5 is a continuous toothed belt 8, such that teeth 37 of belt 8 interlock with the corresponding teeth 38 of rollers 50 and 5, providing a positive drive from roller 5 to roller 50 and to the superimposed belt 4. Parallel to each of the converging drive reaches of the belts 4 and between rollers 50 and 5 are a plurality of relatively small rollers 10 mounted for rotation in frames 9 such that the belt 8 is in contact with the rollers during rotation of the belts 8 and 4. Frames 9 extend from the upper beams 3 to the lower beams 1 and are rigidly braced by cross-bracers 39 extending from vertical posts 2.

A pair of triangular side plates 11 are hinged from upper beams 3 and suspend downwardly between the converging belts to form the remaining lateral sides of the truncated pyramid. Each plate is mounted by hinges 28 between a pair of L-shaped spacer brackets 27 (Fig. 3) secured to a beam 3; the brackets properly position the intermediate plate 11 relative to the converging belts 4. If desired, a heating tube 29 may be mounted contiguous with each plate 11 to provide for heating of the viscous material; the heating tube may have steam, hot water, or hot air circulated therethrough as may be convenient. With the plates 11 being hinged to beam 3, the lowermost portion of each plate has adjustment means provided so that the convergency of the plates 11 towards each other may be varied to provide for a greater or a smaller outlet throat. The adjustment means comprises a horizontal bar 20 (Fig. 4) pivotally mounted, as at 24, to plate 11 and slidable along bracket 22 secured to beam 1. A plurality of holes 21 are punched in the bar 20 and a matching hole is punched in bracket 22. Thus, bar 20 may be reciprocated back and forth to adjust the convergency of plates 11 as desired and a particular adjustment may be locked by means of pin 23 secured through the hole in bracket 22 and one of the matching holes 21 in the bar.

Cleaning means are provided on either side of each belt 4 to prevent the viscous material from adhering thereto. Referring to Fig. 5, each of such means comprises a frame 30 mounted between a pair of the vertical posts 2, and an L-shaped scraper having legs 32 and 33 welded to a rotatable horizontal shaft 31, which shaft is journaled in a plate 36 secured to the frame 30. A bracket 34, attached to frame 30, parallels the leg 32 and has a plurality of adjusting bolts 35 therethrough so that adjustment of the bolts 35 allows rotation of the shaft 31 and scraper unit 33. Roller 44 is mounted for rotation to the posts 2 for continuous contact with belt 4 to insure positive contact between leg 33 and belt 4.

The driving means for the belt system comprises an electric motor 13, and a plurality of inter-meshing drive gears, 42, 43 connected to the motor 13 by belt 40 meshing with gear 41 and to the belt system by gears 48, 49 attached to the shafts associated with rollers 5.

Referring to the schematic views of Figs. 6 and 7, the viscous material is fed into the hopper, formed by side plates 11 and the converging belts 4, either by hand or by automatic means well known in the art. The action of the belts 4 upon the cohesive material is such that constant downward force is imposed upon the material constantly urging the material downward to the outlet of the hopper and forming the material into a compact voidless mass. The tremendous side pressures are taken up or absorbed by the rollers 10 so that each belt 4 has to resist only the tension of operation while the compaction of the material is taken up by the rollers. Belts 8 provide power from rollers 5 to rollers 50; in addition, since belts 4 are contiguous with the toothed belts adjacent rollers 50, 5 and 10, they also provide a constant drive to each of the belts 4. The drive is selected to give a constant pressure discharge. The operator, by selecting a torque, can set the feeder to deliver material at almost any desired rate. Should the receiving machine, as for example an extruder 46 with an appropriate inlet 45, not take the material fast enough, the drive stalls or slows down without damage until more material is required. The operator finds by experience the proper torque to use since optimum results are obtained by providing as much rolling contact, between the belts and the material, as possible. This rolling contact keeps the material from tending to stick to the belts and to carry itself around and out through the relatively small clearances between the nozzle, formed between the belts 4 and the side plates 11, and the extruder inlet 45.

Figure 4:
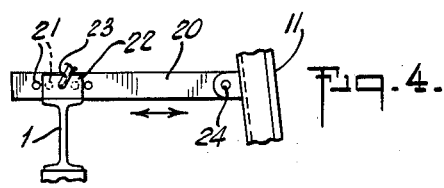
Fig. 4 illustrates the means for positioning such side plates.

In addition to allowing adjustment of plates 11, the adjusting means of Fig. 4 acts as a quick pressure release in the event of jamming. Thus, when the machine is jammed from over feeding, pins 23 are pulled, allowing plates 11 to diverge under the jamming pressure and the machine throat can subsequently be cleared by hand.

Numerous refinements and modifications will readily suggest themselves to those skilled in the art, which refinements and modifications are believed to be within the scope of this invention. Thus, for example the material may be such as to feed directly into containers; rollers 50 and 7 may be made adjustable to control the tracking and tension on each set of belts; various parting agents may be used to reduce sticking of the material on the belt; additionally, it is also evident that the toothed belt 8 may be replaced by other drive means, as for example, a band of roller chain, and the modified structure would still be within the preview of this invention. Likewise, belts 4 and 8 have been shown to be of equal widths; the width of belt 8 can be relatively narrow as compared to the width of belt 4 without affecting the results obtained. The present invention has been described in detail for purposes of illustration only and is not intended to be limited by this description or otherwise except as defined in the appended claims.

What I claim is:

1. Apparatus for compacting and feeding masses of cohesive materials comprising a hopper having the shape of an inverted truncated pyramid and having an outlet at the bottom thereof, said hopper comprising a pair of oppositely disposed continuous main driving belts, each having a plurality of teeth on its inner surface, a pair of continuous cover belts respectively superimposed each on a portion of one of the main driving belts, a plurality of generally parallel and generally vertically tiered rollers rotatably mounted in fixed positions behind each of the driving belts, a pair of oppositely disposed plates mounted between the belts, said cover belts and said plates comprising sides of the pyramid, means to heat at least one of the plates to increase the temperature of the passing cohesive materials and thereby to reduce their viscosity, and means to vary the positioning of the plates relative to each other to vary the outlet area of the hopper.

2. Apparatus for compacting masses of cohesive materials as recited in claim 1, wherein the last recited means include pin retaining means for maintaining the plates in fixed position and which, upon removal, act as fast pressure release means in the event of material jam within the hopper.

3. Apparatus for compacting masses of cohesive materials as recited in claim 1, further including cleaning means for the cover belts to prevent continual sticking of portions of the cohesive materials to the belt.

References Cited in the file of this patent

UNITED STATES PATENTS

| | | |
|---|---|---|
| 621,951 | Swenson | Mar. 28, 1899 |
| 1,153,103 | McNeale | Sept. 7, 1915 |
| 1,762,268 | Green | June 10, 1930 |
| 2,657,428 | Upton | Nov. 3, 1953 |

FOREIGN PATENTS

| | | |
|---|---|---|
| 490,353 | Germany | Jan. 27, 1930 |
| 414,515 | France | June 21, 1910 |